Feb. 7, 1967  A. GSELL  3,302,693
REGENERATIVE HEAT EXCHANGER WITH STATIONARY HEAT
RETAINING MASS AND ROTATABLE CONNECTIONS
Filed Jan. 3, 1964  2 Sheets-Sheet 2

3,302,693
REGENERATIVE HEAT EXCHANGER WITH STATIONARY HEAT RETAINING MASS AND ROTATABLE CONNECTIONS
Albert Gsell, Weinheim, Bergstrasse, Germany, assignor to Svenska Rotor Maskiner Aktiebolag, Stockholm, Sweden, a company
Filed Jan. 3, 1964, Ser. No. 336,853
3 Claims. (Cl. 165—4)

The present invention relates to a regenerative heat exchanger of the type comprising a stationary annular heat retaining mass and duct members at both ends of said mass rotatable around a substantially vertical axis for directing a fluid flow axially through said mass. Such a heat exchanger is described for instance in U.S. Patent 3,233,661. According to ths patent the rotatable duct members are carried by the stationary annular heat retaining mass and journalled in bearings at the central part thereof.

The invention has for its object to provide a heat exchanger of the above-mentioned type in which the heat retaining mass is relieved from the load of the rotatable duct members.

Another object of the invention is to provide a heat exchanger in which the most heavily loaded bearing for the rotatable duct members is easily accessible for maintenance and repair.

These and further objects of the invention will be apparent from the following description of a preferred embodiment shown in the accompanying drawing.

Figure 1:
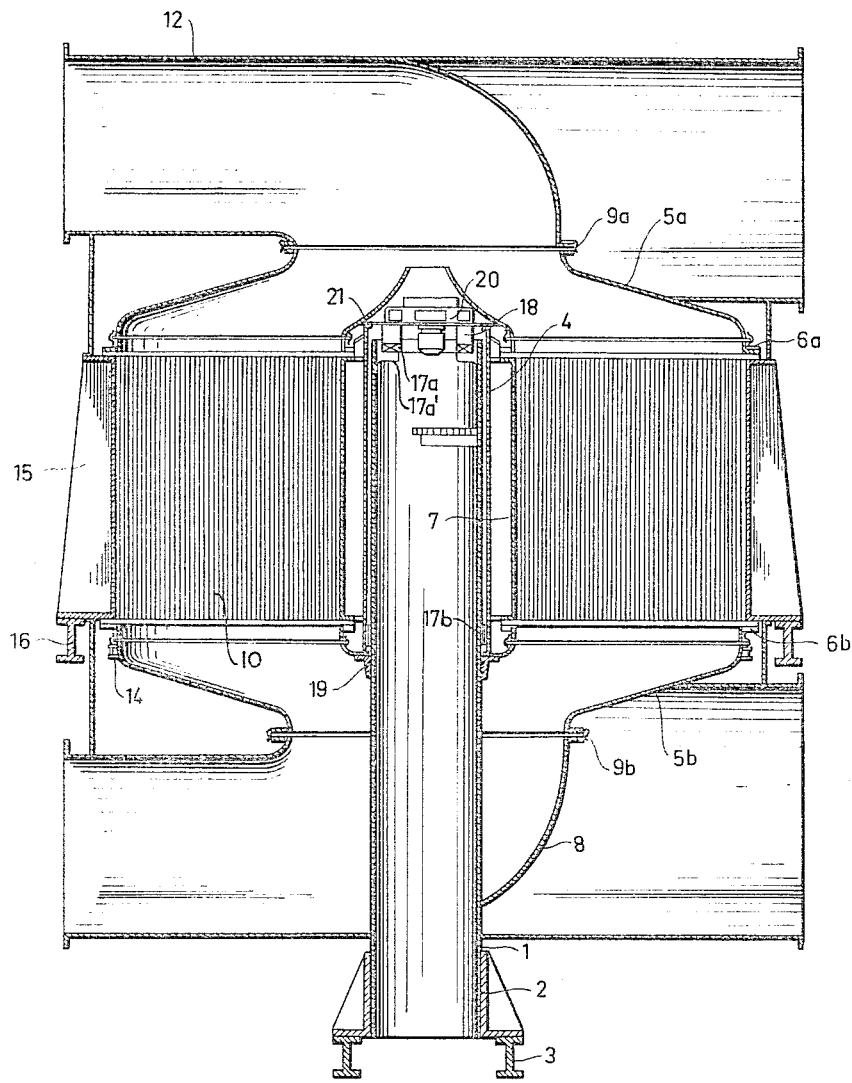
Figure 2:
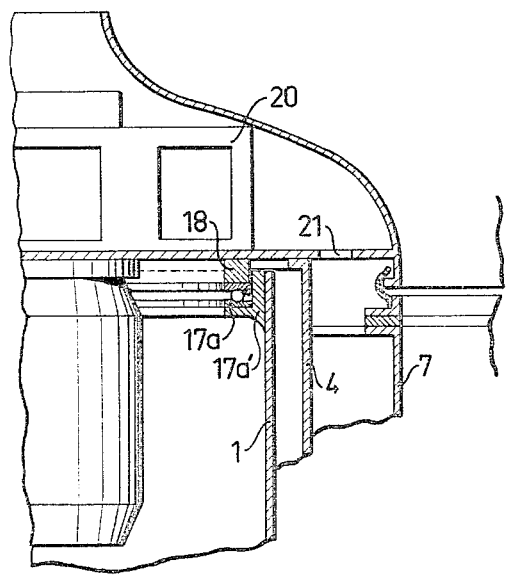
Figure 3:
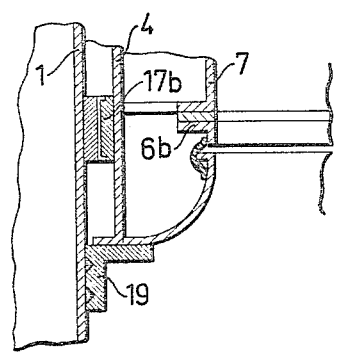

FIG. 1 shows a vertical section through a regenerative heat exchanger according to the invention while FIGS. 2 and 3 show certain details of FIG. 1 on a larger scale.

Referring to the drawing numeral 1 indicates a vertical supporting tube which at its lower end is provided with brackets 2 resting on horizontal beams 3. The upper portion of the supporting tube 1 is surrounded by a tube 4 which at its ends is connected to rotatable duct members 5a and 5b, respectively. These rotatable duct members serve to direct a flow of one of the heat exchanging fluids, i.e., air, axially through a stationary annular heat retaining mass 10 to the outer periphery of which are secured brackets 15 by means of which the mass or stator 10 is supported by horizontal beams 16. The mouths of the duct members 5a and 5b carry sealing frames 6a and 6b, respectively, which is known manner cooperate with corresponding sealing surfaces at the ends of the stator 10. The radially inner wall of the annular stator 10 consists of the tube 7 surrounding the connecting tube 4. Air is supplied to the rotatable duct member 5b through a stationary channel 8 and the heated air is discharged from the rotatable duct member 5a to a stationary discharge channel 12. Between the stationary channels 8 and 12 and the rotatable duct members 5b and 5a, respectively, there are provided sealing means 9b and 9a.

The rotatable duct members 5a and 5b and the connecting tube 4 form a rigid unit which is rotatably supported by a thrust bearing 17a the stationary element of which rests on a seat 17a' secured to the inside of the supporting tube 1 at the upper end thereof. The rotating race of the bearing 17a is connected to the upper rotatable duct member 5a through a ring 18. As shown in FIG. 2 thet bearing 17a consists of a combined thrust and radial bearing.

The lower end of the connecting tube 4 is guided on the outside of the supporting tube 1 by a radial bearing 17b shown most clearly in FIG. 3.

From the drawing it appears that the bearings 17a and 17b are located at substantially the same levels as the sealing surfaces at the upper and lower ends, respectively, of the stator 10.

If desired, means may be provided for cooling the seat 17a' by means of a cooling liquid.

To the outside of the rotatable duct 5b is secured a rack ring 14 engaged by a driving gear not shown.

Below the radial bearing 17b there is provided a packing box 19. This packing box prevents air in the duct member 5b from entering the space between the connecting tube 4 and the supporting tube 1 which air normally is of higher pressure than the ambient air.

In the hub portion of the upper rotatable duct member 5a there is provided a fan 20. This fan 20 serves to remove leakage air and gas from the space between the connecting tube 4 and the stator tube 7 through openings 21 and to deliver such leakage fluids into the discharge channel 12.

The diameter of the supporting tube 1 is so large that a person can enter the interior thereof from below and climb upwardly to the top end of the tube where the bearing 17a is easily accessible for inspection and repair. Due to the fact that in an air preheater the air has a higher pressure than the flue gases the fluid flow passing from the lower or cold end of the heat exchanger upwardly through the space between the stator tube 7 and the connecting tube 4 to a great extent consists of cold leakage air which has a cooling effect on the central portion of the heat exchanger and thus also on the bearings 17a and 17b.

I claim:
1. A regenerative heat exchanger comprising a stationary annular heat retaining mass, duct members at both ends of said mass rotatable around a substantially vertical axis for directing a fluid flow axially through said mass, a connecting tube interconnecting the duct members at opposite ends of said mass, said connecting tube passing centrally through said mass, a central supporting tube extending from below through the lower rotatable duct member and upwardly through said connecting tube, and a thrust bearing at the upper end of said supporting tube for rotatably mounting the upper end of said connecting tube.

2. A regenerative heat exchanger as defined in cliam 1, wherein a radial bearing is provided at each end of said connecting tube.

3. A regenerative heat exchanger as defined in claim 1, wherein said thrust bearing is a combined thrust and radial bearing and a radial bearing is provided at the lower end of said connecting tube.

References Cited by the Examiner

UNITED STATES PATENTS 3,024,004   3/1962   Stoddard et al. _____ 165—7

FOREIGN PATENTS 905,646   9/1962   Great Britain.

MEYER PERLIN, *Primary Examiner.*

ROBERT A. O'LEARY, *Examiner.*

A. W. DAVIS, *Assistant Examiner.*